MAGNETIC DEVICE

Original Filed Sept. 28, 1951 4 Sheets-Sheet 1

INVENTORS
JOSEPH CHEDAKER
GEORGE G. HOBERG
EUGENE A. SANDS
BY
Fidler, Crouse & Beardsley
ATTORNEY INVENTORS
JOSEPH CHEDAKER
GEORGE G. HOBERG
EUGENE A. SANDS
BY
Fidler, Crouse & Beardsley
ATTORNEY INVENTORS
JOSEPH CHEDAKER
GEORGE G. HOBERG
EUGENE A. SANDS
BY
Fidler, Crouse & Beardsley
ATTORNEY Nov. 18, 1969 J. CHEDAKER ET AL 3,479,659

MAGNETIC DEVICE

Original Filed Sept. 28, 1951 4 Sheets-Sheet 4

INVENTORS
JOSEPH CHEDAKER
GEORGE G. HOBERG
EUGENE A. SANDS
BY
Fidler, Crouse & Beardsley
ATTORNEY 3,479,659
MAGNETIC DEVICE Joseph Chedaker, Glenside, and George Gilbert Hoberg, Devon, Pa., and Eugene Arthur Sands, Chapaqua, N.Y., assignors to Burroughs Corporation, a corporation of Michigan Continuation of application Ser. No. 248,716, Sept. 28, 1951. This application June 20, 1966, Ser. No. 596,352
(Filed under Rule 47(a) and 35 U.S.C. 116)
Int. Cl. G11b *5/00*
U.S. Cl. 340—174 60 Claims

ABSTRACT OF THE DISCLOSURE

A multi-aperture magnetic memory core which can be nondestructively sensed having the following aspects: (1) The sensing flux is generally localized. (2) The remanent flux through one path of the core determines the amount of coupling between two windings coupled to another path. (3) The core is a composite core with high remanence characteristics in the path about one aperture and low remanence characteristics in the paths about two other apertures, and the high remanent path of the core serves to maintain a residual flux level through the low remanent paths. (4) The core serves as a logical OR circuit since either of two windings can control its remanent state. (5) The remanent magnetic flux in the first magnetic path or circuit can be used to control the flux level in the second magnetic circuit, and the remanent flux of the first circuit sensed by sensing the flux condition of the second circuit. (6) The core can serve as a pick-up head.

This application is a continuation of a copending application Ser. No. 248,716, entitled "Magnetic Device," which was filed on Sept. 28, 1951 and now abandoned by the same inventors.

The present invention relates to improvements in magnetic devices for storing information in and recovering information from magnetic fields.

Various means and methods have in the past been suggested for recovering, in the form of electrical signals, intelligence stored on a magnetizable medium. Generally speaking, the operation of prior art devices is dependent upon relative movement between a changing magnetized medium and a pick-up or reading device for inducing electrical signals in the latter. To obtain usable outputs from the prior art devices, it is necessary to effect relative movement between the record and the pick-up device within a range of speeds related to the rate of relative movement between the record medium and a magnetic recording device during the production of the record. In certain applications, however, it is desirable to record information at a high rate of delivery and then read the information at a compartively slow rate of speed. Thus, for example, information derived from a computing apparatus may be delivered to a recording device at a rate of speed much greater than that at which known printing devices are capable of functioning. Heretofore, when it was desired to operate a printing device to print information recorded at a high speed on a moving magnetic record medium, it was necessary to provide storage means capable of storing information imparted thereto at a comparable speed, from which storage means the information could subsequently be extracted at a low speed at which printing could be performed. Prior storage systems are quite expensive and complicated.

Accordingly, one object of the present invention is to provide novel and improved means for reading information contained in a magnetic field.

Another object is to provide an improved magnetic device for detecting intelligence contained in a static magnetic field.

Another object is to provide novel and simple means for receiving information from static and/or dynamic magnetic fields.

Still another object is to provide novel and simple means for detecting the instantaneous character of magnetic fields independently of the rate of change of flux with respect to such means.

Still another object is to provide a novel and simple magnetic memory device.

A still further object is to provide a novel and simple magnetic memory device capable of providing a continuous nondestructive indication of stored information, that is, an indication which does not necessitate erasing such information.

Another object is to provide a novel and simple device for extracting information from a magnetic record substantially independently of the rate of travel of the record with respect to the device.

Still another object is to provide a novel and simple pick-up device whose effectiveness in reading information stored in a magnetic field is independent, at the time of reading, of the relative rate of movement between the device and the field from a certain maximum down to, and including zero.

Still another object is to provide a novel device capable of detecting the instantaneous character of local magnetic fields, as well as of recording information on a magnetizable medium through magnetic induction.

Other objects and advantages of the invention will become apparent from the following description of preferred embodiments thereof illustrated in the accompanying drawings in which.

Figure 1:
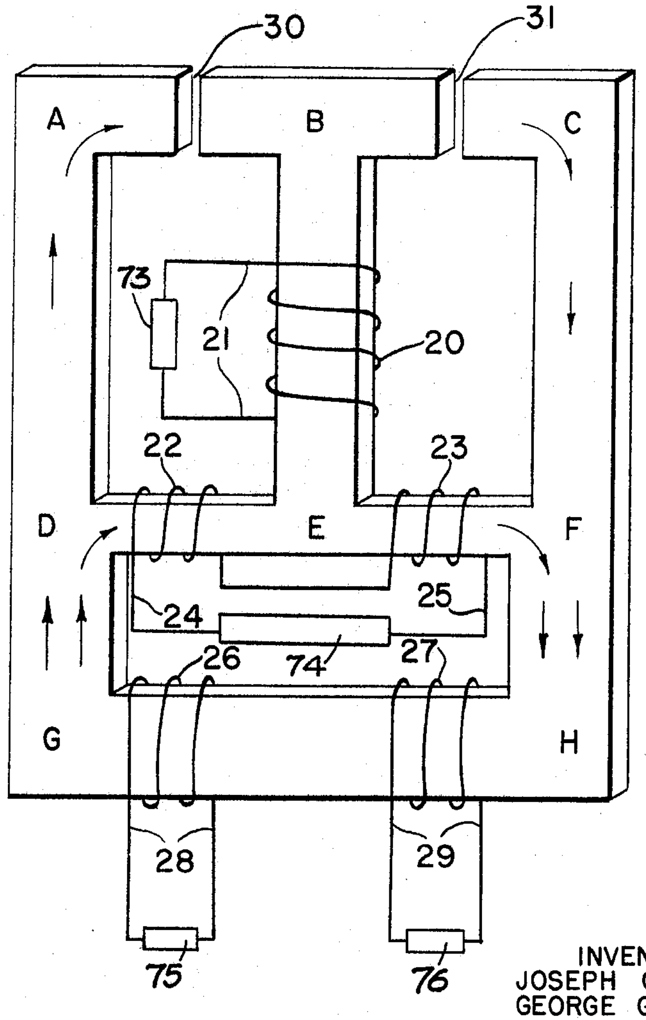
FIG. 1 shows one embodiment of the invention.

For a better understanding of the invention, reference is had to FIG. 1 wherein a specific embodiment is illustrated by way of example. The device shown in FIG. 1 comprises a magnetic core 10 having three magnetic circuits designated ABED, BCFE and DFHG. Magnetic circuits ABED and BCFE are symmetrical about center leg BE which is common to the two circuits. Leg DEF of the magnetic circuit DFHG has a portion DE in common with magnetic circuit ABED and a portion EF in common with circuit BCFE.

Wound about leg BE is a winding 20 having input leads 21 connected to a source 73 of input pulses, and wound about leg DEF is a pair of output windings 22 and 23 connected in series aiding relationship and separated by leg BE. The terminals 24 and 25 of output windings 22 and 23 are connected to a suitable load 74. The device is shown as being provided with a pair of separate input windings 26 and 27 having input leads 28 and 29, respectively. These windings may be connected to a single source or to separate sources 75 and 76, respectively, which impress thereacross information in the form of electrical signals to be stored and read. Air gaps 30 and 31 are inserted in legs AB and BC, respectively, in order to increase the reluctance thereof.

The complete core assembly shown may be fabricated from a stack of suitably punched laminations in order to reduce the core losses.

For the purposes of the present invention, as will be apparent from the description of the operation of the embodiment illustrated in FIG. 1, it is desirable that the residual magnetism of the magnetic core material used therein be comparatively high. The magnetic material should preferably have a substantially rectangular hysteresis loop or magnetization curve somewhat similar to that shown in FIG. 2, wherein the flux density B is plotted against the applied field strength H. However, a considerable variation in the shape of the hysteresis loop can be tolerated. Various magnetic materials, such as certain nickel-iron alloys, have such characteristics and one magnetic material which is eminently suitable for practicing the invention may consist of approximately 45% Ni, 54.4% Fe, and 0.6% Mn, 95% cold reduced and annealed at 1100° C.

Figures 2, 3, 5:
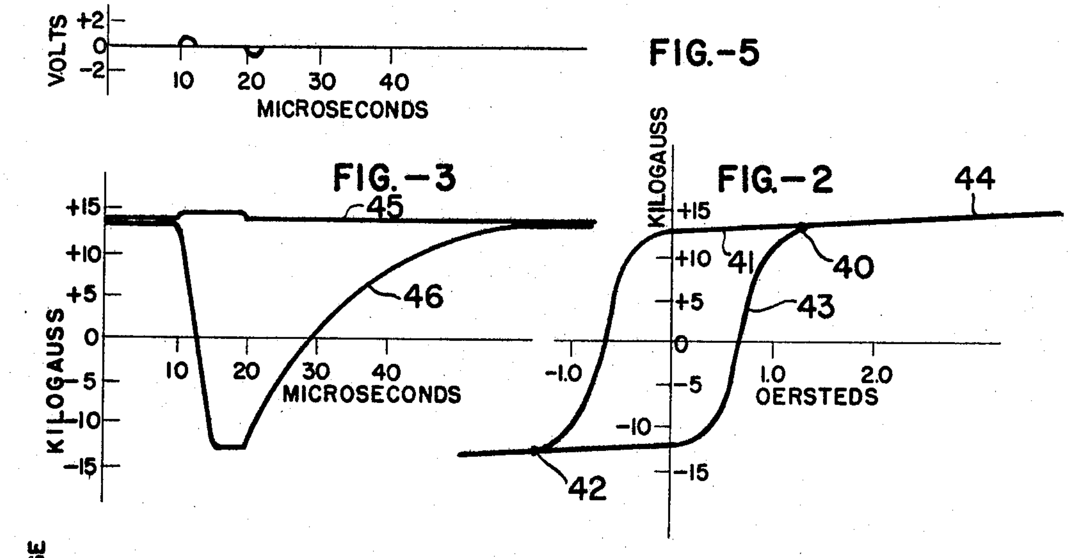

It will be assumed herein that the core material has a magnetization curve such as shown in FIG. 2. Thus, if a field of sufficient strength to magnetize leg DEF to point 40 of the curve of FIG. 2 is applied to the core, a reversal of this field will cause the magnetization to follow curve 41 down to point 42, and a subsequent reversal of the field will cause the magnetization to follow curve 43 up to point 40 again.

If the cross-sectional area of leg DEF is made substantially smaller than the cross-sectional area of core section DGHF, and if the reluctance of leg DEF is small as compared with the reluctance of leg ABC, the remanence in core section DGHF will maintain leg DEF at a higher flux density than that existing in the remainder of the core.

Wherefore, in accordance with one feature of the present invention, the cross-sectional area of at least a portion of core section DGHF is made sufficiently large with respect to the cross-sectional area of leg DEF that the remanence in the core section after it once has been magnetized up to or near its saturation point will maintain leg DEF in substantially saturated condition. It will be noted that the high reluctance of air gaps 30 and 31 in leg ABC will aid in concentrating the remanence flux in leg DEF.

If leg BE is subjected to a magnetizing field such as caused by a direct current flowing through winding 20, a flux will tend to flow in opposite directions through paths ABED and BCFE. This will be in the same direction as the remanence flux in one of the legs DE or EF and in the opposite direction to the remanent flux in the other leg. Very little change in flux will occur in the leg wherein the two fluxes tend to flow in the same direction, if a substantial amount of remanence flux is already flowing through this leg, but a relatively large change of flux will occur in the leg wherein the two fluxes flow in opposite directions.

This differential in change of flux between legs DE and EF is, in accordance with the present invention, utilized to provide an indication of whether a remanence flux exists in leg DEF and if so, in which direction.

The various dimensions of the core structure shown in FIG. 1 may be varied over a considerable range without destroying the operability of the device and changes as to form and relative proportioning of the various components may be made to meet specific operating requirements. By way of example, the values of the various components of the device illustrated in FIG. 1 may be as follows:

| Core section | Cross-sectional area |
|---|---|
| DABCF | .0015 in.$^2$ |
| BE | .0015 in.$^2$ |
| DF | .0010 in.$^2$ |
| DGHF | .003 in.$^2$ |

| Coils | No. turns | Air gaps | Width (in.) |
|---|---|---|---|
| 20 | 100 | 30 | .02 |
| 22 | 100 | 31 | .02 |
| 23 | 100 | | |
| 27 | 40 | | |
| 28 | 40 | | |

The operation of the device will be more fully understood from the following description of a specific operation of the embodiment illustrated in FIG. 1. Let it be assumed that information of the binary type, i.e., yes or no, is generated with a source 75 or 76 connected to one of windings 26 or 27, and that it is desired to store such information and to extract it at a time different from that at which the condition of the source changes from one state to another. Suitable means, well known in the art, may be utilized to generate across the output of the source a D.C. voltage pulse of one polarity when it is in, or changes to, one condition and a D.C. voltage pulse of the opposite polarity when it is in, or changes to, the other condition.

Figures 6, 7:
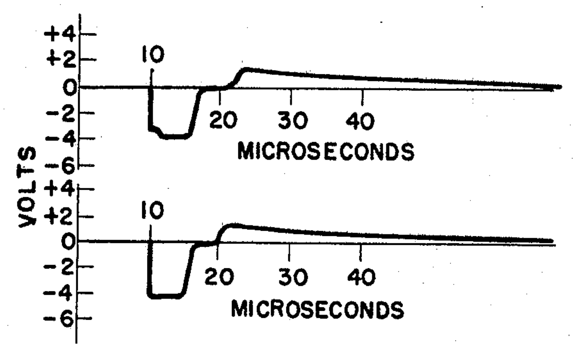
FIGS. 2 to 7 show curves illustrating various operating characteristics of the embodiment illustrated in FIG. 1.
Figure 4:
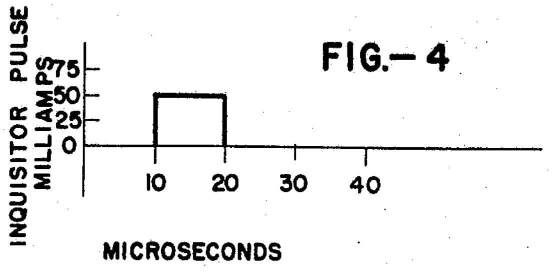

A complete operating cycle of the device shown in FIG. 1 will now be described referreing to the somewhat idealized illustrative curves shown in FIGS. 3 to 7, whereof FIG. 3 shows the relative changes in the flux of legs DE and EF, FIGS. 5 and 6 show the voltages induced in windings 22 and 23 due to the change in flux flowing through respective legs with which they are associated, and FIG. 7 shows the wave shape of the resultant voltage appearing across leads 24 and 25, all occasioned by an inquisitor current pulse having a wave shape as shown in FIG. 4 flowing through winding 20 while a remanence flux is flowing through leg DEF. The curves shown in FIGS. 3 to 7 are plotted against abscissas having a common time scale measured in microseconds, the beginning of the cycle being taken as at 10 microseconds.

The current pulse shown in FIG. 4, and which may be termed an inquisitor pulse, may be produced by a suitable source 73 connected across leads 21. An inquisitor pulse is herein defined as a current pulse which, when applied to the device, enables the reading of intelligence stored in core 10. It will be assumed that the inquisitor current will flow through winding 20 in such a direction as to generate a flux which will flow downwardly through leg BE. The choice, however, is an arbitrary one; the inquisitor pulse current could equally well be in the opposite direction. Also, it will be apparent that the inquisitor current pulse, shown as a square wave pulse in FIG. 4, may, in fact, be merely the first half-cycle of a sine wave and, hence, that winding 20 may be excited by a sine wave signal rather than a square wave pulse.

Assume that the source of information connected to winding 26 or 27 has momentarily caused a direct current to flow therethrough in such a direction as to cause a substantially saturating flux to flow through the core of FIG. 1 in the direction indicated by the arrows, and that the remanence in the core is of sufficient strength to maintain leg DEF magnetized up to point 40 of FIG. 2.

If now an inquisitor pulse as shown in FIG. 4 is caused to flow through winding 20 in the direction assumed above, the resulting flux, which for the sake of convenience will hereinafter be referred to as inquisitor flux, flows downward in leg BE and then attempts to flow from left to right through leg EF and from right to left through leg DE. However, such a flux change through leg EF would add to the remanence flux already flowing through this leg. Because of the saturation flux already existing in this leg, very little additional flux will be caused to flow therethrough. This change is manifested by the change from point 40 to 44 in the hysteresis loop of FIG. 2. The inquisitor flux through leg DE, on the other hand, will be flowing in a direction opposite to that of the remanence flux and will cause a substantial flux change in this leg, as manifest by a change from point 40 toward point 42 in the hysteresis loop. The magnitude of the flux change thus produced in leg DE will, of course, depend upon the magnitude of the inquisitor pulse which is employed. It will be noted from FIG. 2 that the maximum possible change of flux in leg DE will be substantially twice the saturation flux of that leg. However, with the inquisitor pulse of FIG. 4, and with the airgaps 30 and 31 present, the magnitude of the flux change in leg DE will be some lesser amount, such as that shown by point 45. When the inquisitor pulse and the field produced thereby are terminated, the remanence in the core section DGHF will again reverse the flux in leg DE so that it follows a portion of curve 43 back to point 40 and will maintain the flux in leg EF at this point.

The changes of flux in legs DE and EF resulting from the application of an inquisitor pulse are plotted against time in FIG. 3, curve 45 showing the change of flux in the leg EF wherein the remanence flux and the inquisitor flux flow in the same direction, and curve 46 showing the change of flux in the leg DE wherein the remanence flux and the inquisitor flux flow in opposite directions. It will be noted from curve 46 that the flux in leg DE changes at a rapid rate from about time 10 microseconds to about 15 microseconds, and then remains at this level for about five microseconds until the end of the inquisitor pulse, whereupon it reverts back to its original condition but at a much slower rate of change because the effect produced by the magnetomotive force of the section DGHF is less than the effect of the magnetomotive force produced by the inquisitor current.

The change of flux in leg DE will induce a voltage in winding 22 which will have the general wave shape indicated in FIG. 6. This voltage attains a maximum amplitude at about time 10 microseconds and remains at this value as long as the rate of change of flux in this leg remains at its maximum value. However, at 15 microseconds it will fall to zero as the flux density in leg DE approaches a constant value. A voltage of the opposite polarity will thereafter be induced in winding 22, as the flux in leg DE is again reversed when the inquisitor pulse is terminated, but due to the lesser rate of change of flux during this period a correspondingly smaller voltage will be induced in winding 22. It will be noted from FIG. 6 that the amplitude of the negative voltage pulse, induced by the reversal of flux in leg DE, resulting from the application of the inquisitor pulse, is approximately three times the amplitude of the voltage pulse induced when the same flux is returned to its initial state by the remanence in core section DGHF.

The changes in flux in leg EF caused by the application and termination of the inquisitor pulse are indicated by curve 45 of FIG. 3. These flux changes induce a small voltage pulse in winding 23 beginning at time 10 microseconds, and a small voltage pulse of opposite polarity beginning at time 20 microseconds. These voltage pulses will be of opposite polarity to those induced in winding 22, and the resulting voltage appearing across output leads 24 and 25 will be the sum of the voltages shown in FIGS. 5 and 6, as shown in FIG. 7.

If the inquisitor pulse is of a polarity opposite to that assumed, so that it produces flux upwardly through leg BE, a small flux change will occur in leg DE and a larger one in leg EF. Thus, FIG. 5 will represent the voltage produced in winding 22, while FIG. 6 represents the voltage in winding 23, but the net voltage across terminals 24–25 will still be that shown in FIG. 7. The sense of the output voltage is, therefore, independent of the polarity of the inquisitor pulse.

If, however, the remanence flux is flowing through the core structure in a direction opposite to that assumed in the above example, i.e., so that the flux will flow through leg DEF from right to left as viewed in FIG. 1 instead of from left to right, a voltage pulse as shown in FIG. 7 but of opposite polarity will appear across output leads 24 and 25 upon the application of an inquisitor pulse.

The required amplitude and duration of the inquisitor pulse will, of course, depend upon the physical dimensions of the device, the coercivity of the material used therein, the number of turns of winding 20 and the impedance characteristics of the output windings together with the load connected thereacross.

In the above example the conditions producing maximum response were assumed. These conditions are not essential, however, in order to produce usable signals across the output of the device. Thus, for example, if the information pulse from source 75 or 76 should fail to establish sufficient remanence in the core to saturate leg DEF, there will be a corresponding increase in the change of flux in the leg DE or EF wherein the inquisitor flux and the remanence flux flow in the same direction. The amplitudes of the induced voltages indicated in FIG. 5 will therefore be increased somewhat, but the voltage pulses appearing across leads 24 and 25 will still be sufficiently asymmetrical to indicate clearly the polarity of the magnetization of the core. In the event that the load connected across output leads 24 and 25 is arranged to operate in response to the polarity of the leading pulse only, even a small amount of remanent flux present in leg DEF will produce a legible output signal. It will be apparent, however, that in order to produce an output signal indicating the presence of a remanence flux the power of the inquisitor pulse must be sufficient to drive the leg DE or EF in which the remanence flux and the inquisitor flux flow in the same direction up to and a little beyond the saturation point. Otherwise, substantially equal and opposite voltages will be induced in windings 22 and 23, and no resultant voltage will appear across output leads 24 and 25.

Therefore, if paths ABED and BCFE are symmetrical and of equal reluctance, and if windings 22 and 23 have an equal number of turns, the application of an inquisitor pulse will produce a voltage across output leads 24 and 25 indicating whether there is a remanence flux flowing through the core and, if so, the direction thereof. This in turn will indicate whether a voltage has been applied to either of the input windings 26 and 27 and, if so, the polarity thereof.

In the event that it is desired to obtain repeated indications as to the magnetic condition of the core, successive inquisitor pulses may be applied to winding 20, thereby causing successive indicating pulses to appear across the output thereof as long as some magnetization remains in the core.

The repetition rate of the inquisitor pulses of the above described embodiment, wherein the various components have the values as stated above, may be as high as 50,000 pulses per second.

It will be noted that the flux flowing through paths BEDA and BEFC due to the application of the inquisitor pulse will have little, if any, demagnetizing effect on core portion DGHF. If the cross-sectional area and length of the core portion DGHF are made large as compared with the cross-sectional area and length of leg DEF, the magnetization stored in this core section will not be appreciably diminished. Thus, an indication of the information stored in the device in the form of residual magnetism may be obtained repeatedly without thereby erasing the information.

It was stated above that the entire core should be made from a high remanence, high coercivity material in order that leg DEF may remain magnetized substantially up to the saturation point thereof after the termination of the information pulse. In certain applications, however, it may be advantageous to make only the core section DGHF from a high remanence, high coercivity material and make the remainder of the core from a high permeability, low coercivity material.

The present device may be used to store information from any type of bi-stable circuits or devices or from any other device capable of producing information in the form of yes or no, as long as the information may be translated into two opposite voltage or current conditions, or a voltage condition at two separate outputs.

Figure 8:
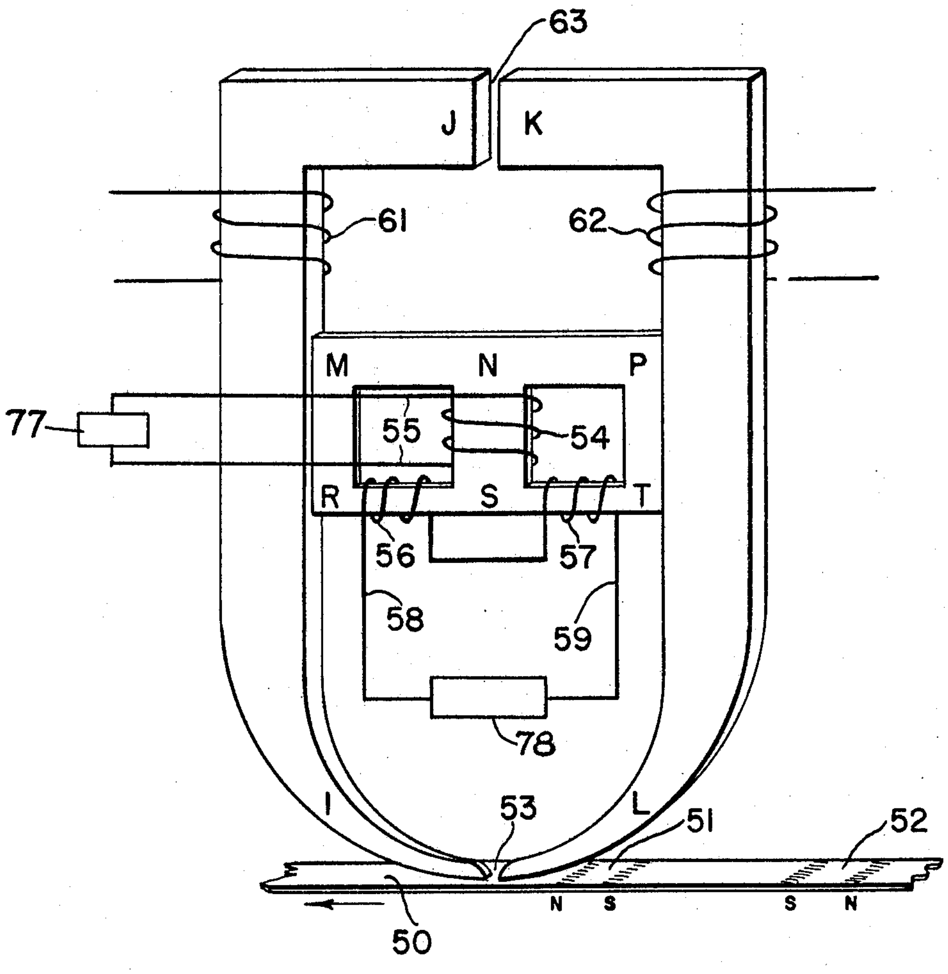
FIG. 8 shows the invention embodied in a magnetic pick-up or transcribing device.

FIG. 8 illustrates a pick-up or recording device embodying the present invention for recovering information recorded on a magnetic recording medium at a very high rate of speed, and whose operation is independent of the relative rate of movement between the device and the medium. The magnetized recording medium is shown in the form of a tape 50 having thereon magnetized portions 51, 52 and which is adapted to be moved past, and closely adjacent to, a pick-up gap 53 separating the two main core legs IJ and KL of the device. Interposed between and bridging these core legs is a core section comprising two bridging legs MNP and RST interconnected by a center leg NS. Wound on center leg NS is a winding 54 which is connected by leads 55 to a source of inquisitor pulses 77, and wound on core leg RST are a pair of output windings 56 and 57 connected together in series aiding relation with respect to unidirectional flow of flux through leg RST and separated by center leg NS. The outside conductors 58 and 59 of windings 56 and 57, respectively, are connected to a suitable load 78.

The main core comprising core legs IJ and KL is preferably made of a high permeability, low coercivity material such as 97% Fe and 3% Si. The main core legs IJ and KL may be provided with windings 61 and 62 whose function will be explained later. A high reluctance air gap 63 separates the main core legs.

The dimensions of the various parts of the core and the number of turns of the windings are not critical, but will to a great extent depend upon the particular application of the device, the magnetomotive force available from the storage medium 50, the impedance characteristics of output windings 56 and 57 together with the load 78, and the magnitude and wave shape and repetition rate of the inquisitor pulses. By way of example, the values of the various components of the device illustrated in FIG. 8 may be as follows:

| Core leg | Cross-sectional area | Winding | No. turns |
|---|---|---|---|
| IJ, KL | .03 in.$^2$ | 54, 56, 57, 61, 62 | 30 |
| MN, NP | .001 in.$^2$ | | |
| | | Airgap | Width |
| NS | .001 in.$^2$ | | |
| RS, ST | .0005 in.$^2$ | 63 | .025 in. |

Figures 9, 10, 12:
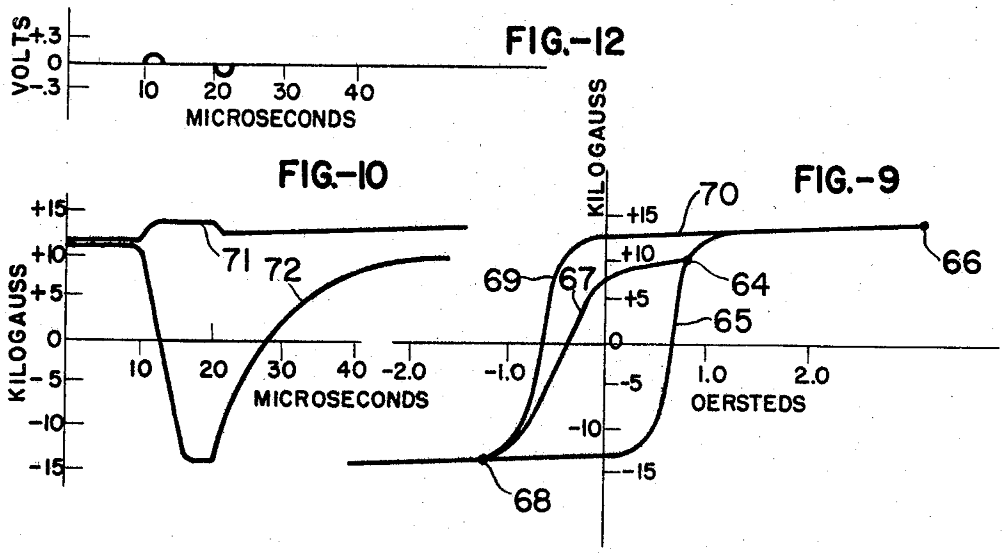

FIG. 9 shows the magnetization curve of leg RST as a magnetomotive force of a strength sufficient to saturate this leg is applied to the core first in one direction and then in the other.

As the individual magnetic elements 51 and 52 of magnetic tape 50 are successively moved past airgap 53 they will successively cause a flux to flow through the device, the flux passing between the main core legs IJ and KL through the airgap 63, leg MNP and leg RST, and will be divided therebetween substantially in inverse proportion to the reluctances thereof. These reluctances should be so proportioned that the magnetomotive force of magnetized elements 51 and 52 of tape 50 will cause a substantial amount of flux to pass through leg RST. It is, of course, preferable that the flux density in leg RST be brought up as high as possible, but as a practical matter, the flux density in this leg will, in a typical case, be brought up to a point such as point 64 of the positive going portion 65 of the magnetization curve or to a corresponding point on the negative going portion 69 of the magnetization curve.

The operation of the device illustrated in FIG. 8 will now be described with reference to the curves of FIGS. 9 to 14. In the following example clockwise flux flow through the core legs IJ and KL, causing a flow of flux through leg RST from left to right as viewed in FIG. 8, will be denoted positive, and flux flow in the opposite direction negative.

Figure 11:
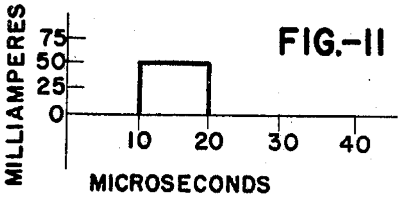

As magnetized element 51 of tape 50 is moved past air gap 53, the north pole will be adjacent the left hand edge of the gap and the south pole will be adjacent the right hand edge as viewed in FIG. 8. This will set up a flux in the core which will flow through gap 63, leg MNP and leg RST from left to right, and in order to simplify the description it will be assumed that the entire leg RST will be magnetized to point 64 on the positive going portion 65 of the magnetization curve of FIG. 9. If now an inquisitor current pulse as shown in FIG. 11 is caused to flow through winding 54 in such a direction that the resulting field will establish a flux which will flow downwardly through center leg NS as viewed in FIG. 8, the inquisitor flux and the flux from the magnetic element 51 will be flowing in the same direction through leg ST and in opposite directions through leg RS.

A complete cycle of operation will now be described assuming that the device is in the condition described above with the magnetized element 51 positioned in gap 53 and that an inquisitor pulse is applied thereto at time 10. This will, depending on the magnitude of the inquisitor pulse, cause the magnetization in leg ST to change from point 64 a substantial distance toward point 66, while the magnetization in leg RS will follow a portion of curve 67 from point 64 toward point 68. When the inquisitor pulse is terminated, the magnetization in leg ST will follow the negative going curve 69 from the region of point 66 to point 70, and the magnetization of leg RS will follow curve 65 from the region of point 68 to point 64 again. The resulting change in flux in the two legs is plotted against time in FIG. 10, curve 71 showing the change of flux in leg ST and curve 72 the change of flux in leg RS. It will be noted that these curves are very similar to the curves illustrating the operation of the core of FIG. 1, with the exception that curve 71 indicates a larger change of flux at time 10 because of the fact that the magnetomotive force of the magnetic elements on tape 50 is insufficient to bring leg RST up to saturation.

Figure 14:
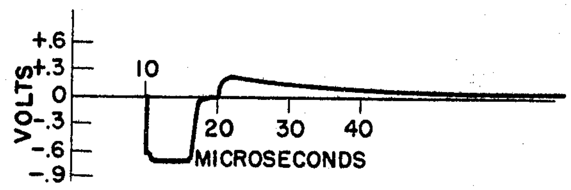
FIGS. 9 to 14 show curves illustrating various operating characteristics of the device illustrated in FIG. 8.
Figure 13:
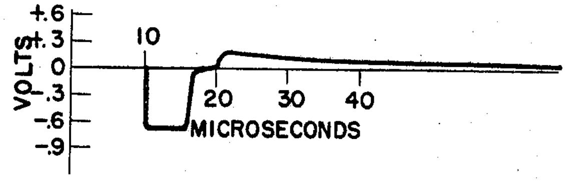

The changes of flux indicated by curves 71 and 72 will induce in the windings 56 and 57 associated with the legs to which the curves apply, voltages as indicated by the curves in FIGS. 12 and 13, respectively, in the same manner as explained in connection with the operation of the embodiment shown in FIG. 1. The resultant voltage appearing across output leads 58 and 59 will be the sum of these voltages as indicated in FIG. 14.

As the magnetized element 51 is moved away from the air gap, there will be a length of the tape wherein no magnetomotive force will be applied across gap 53. Inquisitor pulses applied to the device during this interval will produce equal but opposite voltage pulses in windings 56 and 57, and no resultant voltage will be produced across the output.

When element 52 is moved past the pick-up gap, the south pole of the element will be adjacent the left hand edge of the gap and the north pole adjacent the right hand edge thereof. This will cause a flux to flow in a direction through the core structure opposite to that caused by element 51, and the application of inquisitor pulses to the device while the element 52 is in this position will cause voltage pulses of the same wave shape as depicted in FIG. 14, but of opposite polarity, to appear across output leads 58 and 59 in the manner described above. The polarity of the curves shown in FIGS. 10, 12, 13 and 14 will, of course, also be reversed.

Thus, by applying D.C. inquisitor pulses of a certain polarity across winding 54 while successive magnetized elements bridge pick-up gap 53, asymmetrical voltage pulses of a polarity depending on the polarity of such elements will be produced across windings 56 and 57.

It will be apparent that a larger portion of the total flux produced by the magnetized elements of the recording device may be caused to flow through leg RST by increasing the reluctance of leg MNP, for example, by inserting air gaps therein.

It will be noted that the operation of the device is independent of the speed at which the recording medium passes the pick-up gap as long as at least one inquisitor pulse is applied while each element is in position to cause the required amount of flux to pass through the core.

The pick-up device illustrated in FIG. 8 may also be utilized for recording signals on a magnetizable recording medium such as a magnetic tape. Positive or negative current pulses are applied to the terminals of winding 61 or 62 and will establish a corresponding flux across gap 53. The variations of flux in gap 53 may then be recorded on a tape which is moved past the gap.

We claim:

1. A magnetic device comprising a magnetic core having first, second and third magnetic flux paths, said first path being formed of a closed loop of magnetic material which exhibits a substantially rectangular hysteresis loop, each of said magnetic flux paths having two portions in common respectively with said other two magnetic flux paths, a first conductor linking the portion common to said second and third paths for connection to an energizing source, an output conductor inductively coupled to said first path, and input conductive means linking a portion of the first path which is not common with either of said second or third paths for creating a remanent flux condition in the first path.

2. A magnetic device as in claim 1 wherein all of said paths are formed of a magnetic material which exhibits a substantially rectangular hysteresis loop, including means to energize said first conductor to generate a magnetic flux in said second and third flux paths in a direction to pass through one common portion of said first path in additive relation with the remanent flux therein and through the other common portion of said first path in opposing relation to said remanent flux therein.

3. A magnetic device as in claim 2 wherein the output conductor is linked to the common portions of said first flux path to detect flux changes in said common portions, and including detecting means electrically connected to said output conductor.

4. A magnetic device as in claim 1 wherein the portion of said first path which is not common with any other path has a cross-sectional area larger than the cross-sectional area of the common portions of said first path.

5. A magnetic device comprising a core having first, second and third magnetic flux paths, at least said first flux path exhibiting a substantially rectangular hysteresis loop, a portion of said first and second paths being in common, and a portion of said first and third paths being in common, conductive means for setting said first path in a magnetic remanent state of one polarity or the opposite, means for detecting the remanent state of said first path comprising conductive means coupled to said second and third paths for establishing a flux flow through said paths tending to produce flux through said common portions in opposite directions with respect to the remanent flux in said first path, and output means responsive to the flux flow through said common portions.

6. A magnetic device comprising a core having first, second and third magnetic flux paths, a portion of said first and second paths being in common, a portion of said first and third paths being in common, said first path exhibiting a substantially rectangular hysteresis characteristic, means for magnetizing said first flux path selectively in one sense or the opposite sense to establish remanent flux therein of a predetermined polarity, means for detecting the direction of remanent flux comprising conductive means coupled to said second and third paths for establishing a magnetizing force in said paths tending to cause flux flow through said common portions of the first path in opposite directions with respect to said first path, and output conductive means responsive to the differential in flux flowing through said common portions to produce a voltage indication of such differential.

7. A magnetic device comprising a core having first, second and third magnetic flux paths, said first flux path containing an air gap for detecting magnetizing forces stored on a medium passing said gap, a portion of said first and second paths being in common, and a portion of said first and third paths being in common, means for detecting the flux condition of said first path produced by a magnetizing force passing said airgap comprising conductive means coupled to said second and third paths for establishing a flux flow through said paths tending to produce flux through said common portions in opposite directions with respect to the flux flow in said first path, and output means responsive to the flux flow through said common portions.

8. A magnetic device as in claim 7 wherein said output means includes a conductor linked to said common portions and responsive to the differential in flux flowing through said common portions to produce a voltage indication of such differential.

9. A static magnetic memory device including a closed path of bistable state magnetic material, means for magnetizing said magnetic material selectively in one sense or the other, and means at a localized area of the closed loop for setting up flux only in a localized portion of said path which causes a temporary change of flux about said closed path, and means for detecting the change of flux thus produced in said closed path.

10. A static magnetic memory device including a closed loop of bistable state magnetic material, means for magnetizing said magnetic material selectively in one sense or the other to establish selectively one or the other of said bistable states therein, magnetizing means producing a flux only in a localized area of said loop to cause a temporary change of flux through said loop, and means for detecting the change of flux thus produced in said loop.

11. A static magnetic memory device including a closed loop of magnetic material, at least a portion of said loop being of a bistable state magnetic material, magnetizing means for selectively establishing one or the other of said states in said bistable state magnetic material, magnetizing means external to said closed loop for applying a magnetic field transversely of the direction of the flux in said loop to produce a flux only in a localized area of said loop to cause a temporary change of flux through said loop, and detecting means for indicating the change of flux thus produced in said loop.

12. In a magnetic device including a closed loop of bistable state magnetic material, winding means coupled to said loop for producing steady state magnetization in said loop in one direction or the other in response to current flow through said winding means, means for nondestructively sensing magnetic flux in said closed loop comprising means generating a magnetic field externally of said loop transversely of the steady state flux therein and means applying flux produced by said field through only a localized portion of said loop, and means for detecting a change in flux in said loop resulting from the application of said magnetic field.

13. In a magnetic device including a closed loop of bistable state magnetic material, winding means coupled to said loop for producing steady state magnetization in said loop in one direction or the other in response to current flow through said winding means, means for nondestructively sensing magnetic flux in said loop comprising magnetizing means producing a magnetic field external to said closed loop transversely of the steady state flux therein and means linking flux produced by said field to only a localized portion of said loop, and means for detecting changes of flux in said loop.

14. In a static magnetic storage device including a closed loop of bistable state magnetic material, means for nondestructively sensing the magnetic state of said loop of magnetic material comprising, means producing a magnetic field external to said loop and perpendicular with respect thereto and linked with a portion of said loop for effecting a temporary change of flux in said portion, and means for detecting the resulting change of flux in said loop.

15. In a static magnetic storage device including a closed loop of bistable state magnetic material, means for nondestructively sensing the magnetic state of said loop of magnetic material comprising means producing a magnetic field external to said loop and transversely of the direction of flux therein and linking only a portion of said loop in a direction opposing the flux in the loop to effect a temporary change of flux in said loop, and means for detecting the resulting change of flux in said loop.

16. A magnetic storage device comprising a closed loop of bistable state magnetic material, magnetizing means to cause said loop of magnetic material to be magnetized in either of its two states of polarity, at least one aperture through said loop of magnetic material, a winding through said aperture adapted, when energized, to set up a flux condition in at least a portion of said loop in opposition to flux flowing in one direction in said loop, and means for detecting the resulting change of flux in said loop.

17. A magnetic storage device comprising a closed loop of bistable state magnetic material, means adapted to create a magnetic flux only in a portion of said loop of magnetic material, winding means adapted to create a magnetic flux around said loop of magnetic material selectively of a first polarity or of a second polarity, and means responsive to flux changes in said portion of said loop for producing an output signal indicative of the state of said device.

18. A magnetic storage device comprising a loop of bistable state magnetic material, a first aperture through said loop of magnetic material, a second aperture through said loop of magnetic material, winding means wound through said first and second apertures, said first and second apertures and said winding means being adapted to substantially increase the reluctance to any magnetic flux flowing around the said loop of magnetic material when said winding means is energized, means to cause said loop of magnetic material to be magnetized in either of two states of polarity, and output winding means inductively coupled to said loop of magnetic material.

19. A method for storing signal information in a storage element which is of magnetic material capable of assuming alternate stable states of magnetic remanence and nondestructively sensing such stored information, comprising the steps of magnetizing a storage element having bistable magnetic remanent properties in one or the other of its alternate remanent storage states by causing a magnetic flux to flow along a predetermined path through said element, causing an auxiliary flux to be introduced in a path intercepting said predetermined magnetic flux path and confined entirely within only a portion of said storage element so as to disturb the flux of the stored magnetic state of said storage element, and detecting, along the path of said auxiliary flux, the flux disturbance thus caused, said flux disturbance producing a voltage indicative of the storage state of said element.

20. In combination, a core having bistable state magnetic properties, means for producing along a predetermined path in the core a residual flux of one polarity or the opposite to represent particular information, means for nondestructively sensing the information in said core by providing variations in the residual magnetic flux only in a localized area of said path and in a direction substantially opposed to the residual flux, and conductive means coupled to said core responsive to transient variations in the residual flux produced by the last mentioned means to produce signals representing the polarity of the residual flux.

21. In combination, a core having bistable state magnetic properties, there being at least one hole in the core for interrupting the magnetic continuity of the core, at least a first current conductor magnetically coupled to the core to magnetize the core with a saturating flux of a polarity representing a particular informational value, at least a second current conductor magnetically coupled to the core and extending through the hole in the core to produce instantaneous alterations in the magnetic flux in the core upon the introduction of an interrogating signal and to maintain the saturating magnetic flux in the core in its initial state of polarity even while the instantaneous alterations in the magnetic flux are being produced, the instantaneous alterations in the magnetic flux being indicative of the polarity of the saturating magnetic flux, and conductive means coupled to said core for producing signals in accordance with the instantaneous alterations in the magnetic flux and in representation of the polarity of the saturating magnetic flux.

22. A magnetic device comprising a closed circuit of ferromagnetic material having high rentivity and a substantially rectangular hysteresis loop characteristic, an input winding coupled to said circuit to produce therein remanent flux in a given direction indicative of one of two informational states, and means for non-destructive reading the information stored in said ferromagnetic material, said last-named means including means for producing within only a portion of said circuit two magnetic fields in opposite directions, one of said fields being in the same direction as said given direction of the remanent flux, and an output winding coupled to said circuit.

23. A magnetic memory device of bistable state magnetic material comprising a closed main ferromagnetic circuit having an aperture within a portion thereof to define two ferromagnetic branches, an input winding coupled to said main circuit and adapted to produce therein remanent flux in a given direction, an output winding coupled to said circuit, and an additional winding coupled to said branched circuit in a manner such that in one of the branches a pulsatory magnetic field may be produced in the same direction as said given direction of the remanent flux, and that in the other branch a pulsatory magnetic field may be produced in a direction opposite to said given direction.

24. A magnetic storage element of bistable state magnetic material comprising a closed magnetic circuit, at least one input winding coupled to said circuit, an output winding coupled to said circuit, a pair of spaced openings positioned within said mangetic circuit, and a sensing conductor wound through said openings so as to embrace only that portion of the circuit between said openings.

25. A magnetic bistable storage core comprising a closed magnetic circuit, an input winding about said core, an output winding coupled to said core, at least one pair of axially spaced openings through said magnetic circuit to provide flux paths on either side of said pair of openings, and a sensing coil embracing that portion of the magnetic circuit between said pair of openings.

26. A magnetic storage device comprising a closed loop of magnetic material exhibiting a bistable hysteresis characteristic, first and second apertures through said loop of magnetic material, a first winding means wound through said first and second apertures, said first and second apertures and said first winding means being adapted to substantially increase the reluctance to any magnetic flux flowing around the said loop of magnetic material when said first winding means is energized, first means to cause said loop of magnetic material to be saturated with magnetic flux in a first polarity, second means to cause said loop of magnetic material to be saturated with magnetic flux in a second polarity, and a second winding means coupled to said loop of magnetic material and serving as an output for the device.

27. A magnetic device comprising a unitary core of magnetic material characterized by having a substantially rectangular hysteresis loop, said core having a plurality of apertures therein, means for producing a magnetic flux completely around said core in one sense, and a winding wound through a first and a second of said apertures exclusively so that, when energized by a pulse of either polarity, the magnetizing force generated thereby will produce a flux change in at least a portion of said core adjacent a third of said apertures.

28. A magnetic device comprising a unitary core of magnetic material characterized by having a substantially rectangular hysteresis loop, said core including a closed loop of magnetic material surrounding a first aperture, winding means passing through said first aperture for producing a magnetic flux throughout said core in one sense, second and third apertures through said magnetic material spaced from each other and from said first aperture, winding means coupled to the material of said core adjacent the first aperture, and winding means passing exclusively through said second and third apertures so that, when energized by a pulse of either polarity, the magnetizing force generated thereby will produce a flux change in at least a portion of said core adjacent said first aperture.

29. A static magnetic memory device including a loop of magnetic material having a plurality of stable magnetic remanent states and providing a main magnetic flux path, said loop having a divided main flux path along one portion of its length and thus providing two separate branch paths along said portion, an output winding encircling one of said branch paths, an interrogating winding inductively coupled to a portion of said loop and to said output winding for establishing flux in a localized path around at least a portion of said branch paths for developing signals in said output winding representative of the remanent state of the magnetic material in one of said branch paths, an input winding inductively coupled to said loop for producing flux along said main flux path to establish a remanent flux saturation condition in at least one of said branch paths and for varying the coupling between said interrogating and output windings by reversing the polarity of said remanent flux saturation condition in said one branch path and thus controlling the signals developed in said output winding in response to signals applied to said interrogating winding.

30. A static magnetic memory device including a loop of magnetic material having a plurality of stable magnetic remanent states and providing a main magnetic flux path, said loop having a divided main flux path along one portion of its length and thus providing two separate branch paths along said portion, an output winding encircling one of said branch paths, an interrogating winding inductively coupled to a portion of said loop and to said output winding for establishing flux in a localized path around at least a portion of said branch paths for developing signals in said output winding of an amplitude representative of the remanent state of the magnetic material in one of said branch paths, an input winding inductively coupled to said loop for producing flux along said main flux path to establish a remanent flux level to one of said stable magnetic remanent states in at least one of said branch paths and for varying the coupling between said interrogating and output windings by reversing the polarity of said one of said stable magnetic remanent states in said one branch path and thus controlling the amplitude of signals developed in said output winding in response to signals applied to said interrogating winding.

31. A logical element comprising a magnetic core having a substantially rectangular hysteresis loop characteristic, winding means linking the core, three separate means to energize said winding means with currents two of which are capable of substantially saturating the core in opposite directions regardless of its previous condition of magnetization and the third of which is incapable of reversing the condition of saturation of said core, and output means responsive to said third current for detecting the remanent flux condition of the core.

32. A logical element comprising a magnetic core exhibiting a substantial rectangular hysteresis loop, three windings linking the core, means to energize said windings with currents capable as to two of said windings of substantially saturating the core in opposite directions regardless of its previous condition of magnetization and as to the third of said windings incapable of reversing the saturation of said core, and output circuit means responsive to said current through the third winding for detecting the remanent condition of the core.

33. In combination, a magnetic core exhibiting a substantially rectangular hysteresis characteristic, three magnetic field generators coupled to said core each including a unidirectional pulse source and a conductor, two of said generators being adapted when energized to generate substantially oppositely directed magnetic fields in said core and to drive said core to substantially saturated opposite conditions of flux remanence regardless of its previous condition of magnetization, said third generator being adapted to generate a field in at least a portion of said core substantially parallel to the field of said two generators but of intensity and time duration insufficient to reverse the condition of saturation of said core.

34. A logical circuit comprising an element having a plurality of portions of magnetic material forming at least a first, a second and a third magnetic flux path; a first winding embracing one of said portions which forms a part of both said first and second flux paths, a second winding embracing one of said portions which forms a part of both said first and said third flux paths, a third winding embracing one of said portions which forms a part of said first flux path, and a fourth winding embracing one of said portions which forms a part of both said second and said third flux paths.

35. A magnetic device comprising a core of magnetic material having a substantially rectangular hysteresis loop, said core exhibiting stable magnetic remanent flux states in opposite directions, at least first and second flux paths through said core, said first and second flux paths having a common portion and having other portions which are uncommon, two conductors linked to said first path, means for controlling the magnetic coupling between said first and second conductors by controlling the remanent flux state of said common portion, said means including a conductor linked to said second path and energizing means coupled thereto for setting said second path including its common portion in different selected remanent states.

36. A magnetic core device as in claim 35 wherein said last-mentioned means includes means for selectively setting the second flux path in substantially saturated remanent states in opposite directions to render the magnetic coupling between the two conductors through the first path either high or substantially zero.

37. A magnetic core device as in claim 35 wherein said last-mentioned means includes means for selectively setting the second flux path in intermediate flux remanent conditions to control the amount of coupling between the two conductors linking the first flux path and the consequent level of the coupled signal.

38. A magnetic device comprising a core of magnetic material which exhibits a substantially rectangular hysteresis loop, at least first and second flux paths through said material having a common portion and other portions which are uncommon, first and second conductors linking said first flux path, a source of input signals coupled to said first conductor for producing a flux change through said first flux path when said common portion is in a flux remanent state in one direction, utilization means connected to said second conductor for receiving input signals from said first conductor which are coupled through said first flux path when the common portion is in a remanent state in said one direction, means for controlling the coupling between said first and second conductors by controlling the flux remanent state of said common portion, said means including a conductor linking said second flux path for selectively placing said second flux path including its common portion in a flux remanent state of said one polarity or the opposite polarity.

39. A multi-aperture magnetic core device comprising magnetic material forming a closed loop about a first aperture, said closed loop exhibiting a substantially rectangular hysteresis characteristic, a second aperture through said material, two conductors passing through said second aperture, said conductors being magnetically coupled to one another through the material surrounding said second aperture to a degree which is dependent upon the remanent condition of said material, means for controlling said coupling by controlling the remanent state of at least a portion of the material on one side of said aperture, said means including a conductor passing through said first aperture for selectively setting said portion of material in one direction of magnetic remanence or the opposite.

40. A multi-aperture magnetic core device as in claim 39 including at least a third aperture through said magnetic material and winding means through said aperture, and wherein said means for controlling the coupling between said two conductors through the second aperture also controls the coupling to the winding means through the third aperture, the conductor of said coupling control means selectively setting the remanent state of the magnetic material located between said first and second apertures and that located between said first and third apertures.

41. A multi-aperture magnetic core device as in claim 40 wherein said coupling control means selectively sets the remanent state of at least a portion of the material about the first aperture, and wherein the sense of the respective windings through the second and third apertures is such that for each said remanent state the coupling about one of said apertures is high while that about the other aperture is low.

42. A magnetic device comprising a core having first, second and third flux paths therethrough, at least said third flux path exhibiting a substantially rectangular hysteresis loop, said first and second flux paths each having a portion in common with a portion of said third flux path and their remaining portions uncommon with said third flux path, input winding means linked to said first and second flux paths for producing flux changes in said paths in response to input signals, a first output conductor linked to said first flux path and the second output conductor linked to said second flux path, means for controlling the coupling between said input winding means and said first and second conductors by controlling the magnetic remanence of the common portions of their respective flux paths, said input means including a conductor on said third flux path for controlling the magnetic remanent condition of said third flux path including the portions thereof in common with said first and second flux paths.

43. A magnetic flux device as in claim 42 wherein said core includes at least three apertures therethrough, and wherein said flux paths are each about one of said apertures.

44. A magnetic core device as in claim 42 wherein the cross-sectional area of said third flux path is substantially greater than the cross-sectional area of said first and second flux paths.

45. A magnetic device comprising a core of magnetic material having at least two apertures through said material, said core containing first and second flux paths with one portion of each being in common and the remaining portions uncommon, one of said flux paths being about each of said apertures, and at least said first flux path exhibiting a rectangular hysteresis characteristic, conductive means linked to said first path for producing a remanent magnetic state through said first path in either one direction or the opposite direction, means for determining the direction of remanent flux in said first path, said means including a first conductor linked to said first path and a second conductor linked to said second path, energizing means connected to said second conductor for producing a flux change throughout said second path including the common portion thereof without reversing the remanent flux in said first path, and detection means coupled to said first conductor for detecting a flux change in said first path in response to the flux change produced by said energizing means in said second path.

46. A magnetic device comprising a magnetic core having a first closed flux path which exhibits a substantially rectangular hysteresis loop and a second flux path which exhibits a substantially linear hysteresis loop, said first and second flux paths having a common portion with the remaining portions uncommon, conductive means linked to said first path for producing a ramenant magnetic flux state therein in either one direction or the opposite direction, second conductive means for producing magnetic flux flow through said second path including its common portion, third conductive means coupled to at least one of said flux paths responsive to flux changes produced in said path.

47. A magnetic core device as in claim 46 wherein the second flux path is formed of a different material than that of the first flux path, except in said common portion, and wherein the different material is characterized by a non-linear hysteresis loop.

48. A magnetic device comprising a magnetic core having a first closed flux path which exhibits a substantially rectangular hysteresis loop and a second flux path which exhibits a substantially linear hysteresis loop, said first and second paths having a common portion and the remaining portions uncommon, conductive means linked to said first path for producing a remanent magnetic flux state therein in either one direction or the opposite direction, means for nondestructively sensing the remanent state of said first flux path including conductive means linking said second path for producing a flux change along said second path including the common portion thereof, and an output conductor linked to said first path for detecting flux changes produced therein.

49. A magnetic device comprising a core structure having at least first, second and third flux paths, said first flux path exhibiting a substantially rectangular hysteresis loop characteristic, said second and third paths exhibiting a substantially linear hysteresis loop characteristic, a portion of said first path being common to said second path and a different portion thereof being common to said third path, means for setting said first path in a remanent magnetic state in one sense or the opposite sense, conductive means linked to said second and third paths for producing a flux flow through said second path in one direction and through said third path in the opposite direction with respect to said first path, and a winding linked to said first path for detecting flux changes produced by said conductive means.

50. A storage element comprising a magnetic circuit including a closed loop of magnetic material having a substantially rectangular hysteresis loop, said loop disposed about a main aperture which is located off-center in the magnetic circuit so that the dimensions of the magnetic circuit on one side thereof are larger than those on the other, winding means passing through said main aperture to establish a flux flow in one sense or the opposite sense through said circuit to set said loop in a selected magnetic remanent state, a second aperture passing through said magnetic circuit in the region of its larger dimensions, a sensing winding through said second aperture, an output winding through one of said apertures, and means to energize said sensing winding to create a flux flow about said second aperture and induce a voltage in said output winding which is indicative of the remanent state of said loop.

51. A storage element comprising a closed loop of magnetic material forming a magnetic circuit capable of assuming one or the other of two stable states of remanence, at least one input winding positioned about said magnetic circuit and adapted to be pulsed to place said magnetic circuit in one or the other of said remanence states, an output winding positioned about said magnetic circuit, an opening poistioned within said magnetic circuit and offset from the center line of said magnetic circuit, a sensing winding positioned within said opening and adapted to be pulsed intermittently to produce a flux flow about said opening and induce a voltage in said output winding which is indicative of the remanent state of said storage element.

52. A magnetic logic device including a core having first and second magnetic flux paths, said first path comprising a closed loop of magnetic material which exhibits a substantially rectangular hysteresis loop, said first and second paths having a portion in common and the remaining portions uncommon, at least two input conductors linking said first path each for individually setting said first path selectively into a magnetic remanent state in one sense or the opposite sense in response to applied input signals, means effective following the termination of said input signals for determining whether an input signal has been received in any of said input conductors, said means including a sensing conductor linked to said second path, energizing means electrically connected to said sensing conductor for producing a flux flow through said second path in response to energizing signals, and output conductor means linked to one of said paths and responsive to the flux change produced by said energizing means.

53. A magnetic device comprising magnetic material forming first and second magnetic circuits, at least the major portion of said first magnetic circuit exhibiting a substantially rectangular hysteresis loop characteristic, said magnetic circuits being disposed in close proximity to one another so that in the absence of externally applied magnetizing forces the remanent flux state of the first circuit provides a sufficient magnetizing force to maintain the flux in at least a portion of the second magnetic circuit in a predetermined direction, means for establishing a remanent flux state in one sense or the opposite sense in said first magnetic circuit, means for sensing the remanent flux state of said first magnetic circuit, said sensing means including conductive means coupled to said second magnetic circuit for applying a magnetizing force thereto and producing a flux change in at least the portion of said second circuit which is controlled by the remanent state of the first magnetic circuit, and output conductive means responsive to the changes in flux produced by said sensing means in said controlled portion, the magnetizing force produced by said sensing means being insufficient to reverse the remanent flux state of said first magnetic circuit, said remanent flux state returning the flux in said controlled portion to its predetermined direction upon the terimnation of said magnetizing force.

54. A magnetic device as in claim 53 wherein the magnetic properties of the first magnetic circuit are substantially different from those of the second magnetic circuit.

55. A magnetic device as in claim 53 wherein the cross-sectional area of the first magnetic circuit is substantially larger than that of the second circuit.

56. A magnetic device as in claim 53 wherein the coercivity of the first magnetic circuit is substantially greater than that of the second circuit.

57. A magnetic device comprising magnetic material forming first and second magnetic circuits, at least the major portion of said first magnetic circuit exhibiting a substantially rectangular hysteresis loop characteristic, said magnetic circuits being disposed in close proximity to one another so that in the absence of externally applied magnetizing forces the remanent flux state of the first circuit provides a sufficient magnetizing force to maintain the flux in at least a portion of the second magnetic circuit in a predetermined direction, means for establishing a remanent flux state in one sense or the opposite sense in said first magnetic circuit, means for sensing the remanent flux state of said first magnetic circuit, said sensing means including conductive means coupled to said first and second magnetic circuits for applying a magnetizing force to said circuits, said magnetizing force being of sufficient amplitude and duration to produce a flux change in at least the portion of said second circuit which is controlled by the remanent state of the first magnetic circuit but being insufficient to reverse the remanent flux state of said first circuit, whereby the remanent flux state of said first magnetic circuit returns the flux in said controlled portion to its predetermined direction upon the termination of said magnetizing force, and output conductive means responsive to the changes in flux produced by said sensing means in said controlled portion to produce a voltage indication of the remanent flux state of said first circuit.

58. A magnetic device comprising a core made of substantially rectangular hysteresis loop magnetic material, first and second flux paths through said core, a portion of said first path being common with a portion of said second path and the remaining portions of said paths being uncommon, energizing means magnetically coupled to said common portion for applying a magnetizing force and producing a flux change in said common portion, flux steering means for steering said flux change selectively along said first or said second path, said flux steering means including conductive means for producing a near-saturation flux remanent condition selectively in at least part of the uncommon portions of said first or second path to control the reluctance of said paths to said applied magnetizing force, at least one output conductor magnetically coupled to said core for producing output signals in response to flux changes in the region of said conductor.

59. A magnetic core device as in claim 58 wherein said core includes a third flux path which is characterized by a substantially rectangular hysteresis loop characteristic, said third path having a portion thereof in common with at least one of said first and second paths, and wherein said flux steering means includes a conductor magnetically coupled to said third path for selectively setting the remanent flux in said third path in one direction or in the opposite direction.

60. A magnetic device as in claim 7 wherein said second and third flux paths constitute closed loops of magnetic material exhibiting a substantially rectangular hysteresis characteristic.

References Cited

UNITED STATES PATENTS 2,418,553 4/1947 Irwin ------------- 177—380

JAMES W. MOFFITT, Primary Examiner.

U.S. Cl. X.R.

179—100.2; 340—174.1